United States Patent
Tamori et al.

(10) Patent No.: US 11,533,923 B2
(45) Date of Patent: Dec. 27, 2022

(54) METHOD FOR PRODUCING FREEZE-DRIED SHRIMP

(71) Applicant: NISSIN FOODS HOLDINGS CO., LTD., Osaka (JP)

(72) Inventors: Haruka Tamori, Osaka (JP); Takateru Nakayama, Osaka (JP); Kazuki Yoshida, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 0 days.

(21) Appl. No.: 16/076,970

(22) PCT Filed: Jan. 27, 2017

(86) PCT No.: PCT/JP2017/002931
§ 371 (c)(1),
(2) Date: Aug. 9, 2018

(87) PCT Pub. No.: WO2017/141664
PCT Pub. Date: Aug. 24, 2017

(65) Prior Publication Data
US 2019/0037868 A1    Feb. 7, 2019

(30) Foreign Application Priority Data

Feb. 19, 2016  (JP) .............................. JP2016-029529

(51) Int. Cl.
*A23B 4/037* (2006.01)
*A23L 17/40* (2016.01)
*A23B 4/027* (2006.01)

(52) U.S. Cl.
CPC .............. *A23B 4/037* (2013.01); *A23B 4/027* (2013.01); *A23L 17/40* (2016.08); *A23V 2002/00* (2013.01)

(58) Field of Classification Search
CPC ....... A23B 4/037; A23B 4/027; A23B 4/0053; A23L 17/40
See application file for complete search history.

(56) References Cited

U.S. PATENT DOCUMENTS 6,274,188 B1 *   8/2001   Ledet ...................... A23L 5/13
                                                         426/510
2015/0196040 A1 * 7/2015  Stryker ............... A23B 4/0056
                                                         426/325

FOREIGN PATENT DOCUMENTS

CN       101791137       8/2010
JP       9-009885        1/1997
(Continued)

OTHER PUBLICATIONS

Wang, CN104187871 Machine translation (Year: 2014).*
(Continued)

*Primary Examiner* — Erik Kashnikow
*Assistant Examiner* — Lela S. Williams
(74) *Attorney, Agent, or Firm* — Hamre, Schumann, Mueller & Larson, P.C.

(57) ABSTRACT

[Problem to be Solved] An object of the present invention is to provide a method for producing freeze-dried shrimp that, after cooking by hot water pouring, present a larger apparent size than conventional ones and present a plump, elastic texture.

[Solution] Raw material shrimp are heated by dipping them in hot water at 65 to 75° C. until the shrimp have an internal temperature of 60 to 70° C., and then the shrimp are frozen and subsequently freeze-dried. With this method, it is possible to obtain freeze-dried shrimp that present a larger apparent size and plump, elastic texture after cooking by hot water pouring, as compared with conventional ones obtained by conventional methods for producing freeze-dried shrimp employing heating by boiling in boiling water.

6 Claims, 1 Drawing Sheet

(56) References Cited

FOREIGN PATENT DOCUMENTS

| JP | 2004-305136 | 11/2004 |
|---|---|---|
| JP | 3613566 B | 1/2005 |
| JP | 2009-050173 | 3/2009 |
| JP | 2012-000060 | 1/2012 |

OTHER PUBLICATIONS

Schubring (Journal of Thermal Analysis and Calorimetry, 2009) https://akjournals.com/view/journals/10973/95/3/article-p749.xml?rskey=VFBIJd&result=4 (Year: 2009).*

International Search Report issued in International Application No. PCT/JP2017/002931, dated Apr. 4, 2017, 3 pages.

Written Opinion of the International Searching Authority issued in International Application No. PCT/JP2017/002931, dated Apr. 4, 2017, 4 pages.

Office action issued in corresponding Chinese Patent Application No. 201780011529.5, dated Jan. 24, 2019, 15 pages with translation.

Office Action dated Dec. 4, 2019 in the corresponding Mexican patent application (Application No. MX/a/2018/010019), 11 pages including partial English translation.

Estudios Termicos De La Liofilizacion Del Camarón. Edgar Paredes Ollague. Escuela superior Politécnica del Litoral. (1983), 259 pages, see the attached partial English translation of Mexican Office Action dated Dec. 4, 2019 in Mexican patent application (Application No. MX/a/2018/010019) for a concise explanation of relevance.

* cited by examiner

METHOD FOR PRODUCING FREEZE-DRIED SHRIMP

TECHNICAL FIELD

The present invention relates to a method for producing freeze-dried shrimp.

BACKGROUND ART

Shrimp subjected to freeze-drying have traditionally been used as an ingredient of instant noodles or instant soups to be cooked by hot water pouring. A commonly used method for producing freeze-dried shrimp includes boiling peeled shrimp in boiling water to accomplish sterilization and protein modification that makes the shrimp edible, then freezing the shrimp, and freeze-drying the shrimp.

However, upon cooking by hot water pouring, conventional freeze-dried shrimp shrink into a smaller apparent size and come to have a hard texture. They are therefore unsatisfactory in terms of appearance and texture.

Thus, methods for producing dried shrimp aimed at improving the appearance and texture resulting from cooking by hot water pouring have been developed (Patent Literature 1 to Patent Literature 3, for example).

Patent Literature 1 is directed to a technique related to methods for producing freeze-dried shrimp and designed to reduce the shrinkage of shrimp by a heating process under pressure, and describes a method for producing freeze-dried shrimp by dipping raw material shrimp in a polyphosphate, then heating the shrimp under pressure until the shrimp have an internal temperature of 110 to 115° C., and freeze-drying the shrimp. This method is effective for reduction in the shrinkage of shrimp upon cooking by hot water pouring. However, this method requires a specialized apparatus for heating under pressure. Additionally, the method which involves heating under pressure takes a longer time to cool shrimp than conventional methods. This method is thus disadvantageous in terms of production. Also in terms of texture, this method is still unsatisfactory because the resulting shrimp lacks the plump, elastic texture intrinsic to shrimp.

Patent Literature 2 is directed to a technique for producing voluminous dried shrimp by processing raw material shrimp themselves and describes a method consisting of slitting the raw material shrimp along their back veins in the direction from their back to their stomach and then heating and drying the raw material shrimp. However, the resulting shrimp of this method, albeit being visually voluminous, have an appearance unlike the typical appearance of shrimp. Furthermore, the presence of the slits can unfortunately cause breakage of the dried shrimp during transport.

Patent Literature 3 is directed to a technique for reducing the shrinkage or deformation of shrimp in a heating process with electromagnetic waves and describes a method for producing shrimp in which shrimp are irradiated with electromagnetic waves and then subjected to a heating process. This method is advantageous in that the shrinkage or deformation of shrimp due to heating process can be reduced to obtain shrimp with high elasticity. However, this method requires an expensive, specialized apparatus for electromagnetic wave radiation in order to produce freeze-dried shrimp in large quantities. The cost issue has precluded practical use of this method.

CITATION LIST

Patent Literature

[Patent Literature 1] Japanese Patent Laid-Open No. 2009-50173
[Patent Literature 2] Japanese Patent Laid-Open No. 2012-60
[Patent Literature 3] Japanese Patent Laid-Open No. 2004-305136

SUMMARY OF INVENTION

Technical Problem

An object of the present invention is to provide a method for producing freeze-dried shrimp that, after cooking by hot water pouring, present a larger apparent size than conventional ones and present a plump, elastic texture.

Solution to Problem

As a result of intensive investigations, the inventors have found that when protein modification of shrimp is carried out not by conventional boiling in boiling water but by heating of the shrimp through dipping in hot water at a relatively low temperature, not only can the shrinkage of the shrimp due to the heating by dipping be small, but also it is possible to produce freeze-dried shrimp that present a larger apparent size after cooking by hot water pouring than shrimp obtained through conventional boiling in boiling water and that present a good texture after cooking by hot water pouring. The present invention has been made based on this finding.

That is, the present invention is a method for producing freeze-dried shrimp, comprising the steps of: heating raw material shrimp by dipping the raw material shrimp in hot water at 65 to 75° C. until the shrimp have an internal temperature of 60 to 70° C.; freezing the shrimp heated by dipping; and freeze-drying the frozen shrimp.

Furthermore, in the present invention, the step of heating by dipping is preferably a step of heating the raw material shrimp by dipping the raw material shrimp in hot water at 70 to 75° C. until the shrimp have an internal temperature of 60 to 65° C.

Furthermore, in the present invention, the step of heating by dipping is preferably preceded by a step of dipping the raw material shrimp in a 0.5 to 2 wt % aqueous solution of a polyphosphate.

Furthermore, in the present invention, when the step of dipping the raw material shrimp in an aqueous solution of a polyphosphate is performed, the polyphosphate is preferably sodium tripolyphosphate and/or sodium pyrophosphate.

Advantageous Effect of Invention

The present invention can provide a method for producing freeze-dried shrimp that, after cooking by hot water pouring, present a larger apparent size than conventional ones and present a plump, elastic texture.

DESCRIPTION OF EMBODIMENTS

Figure 1:
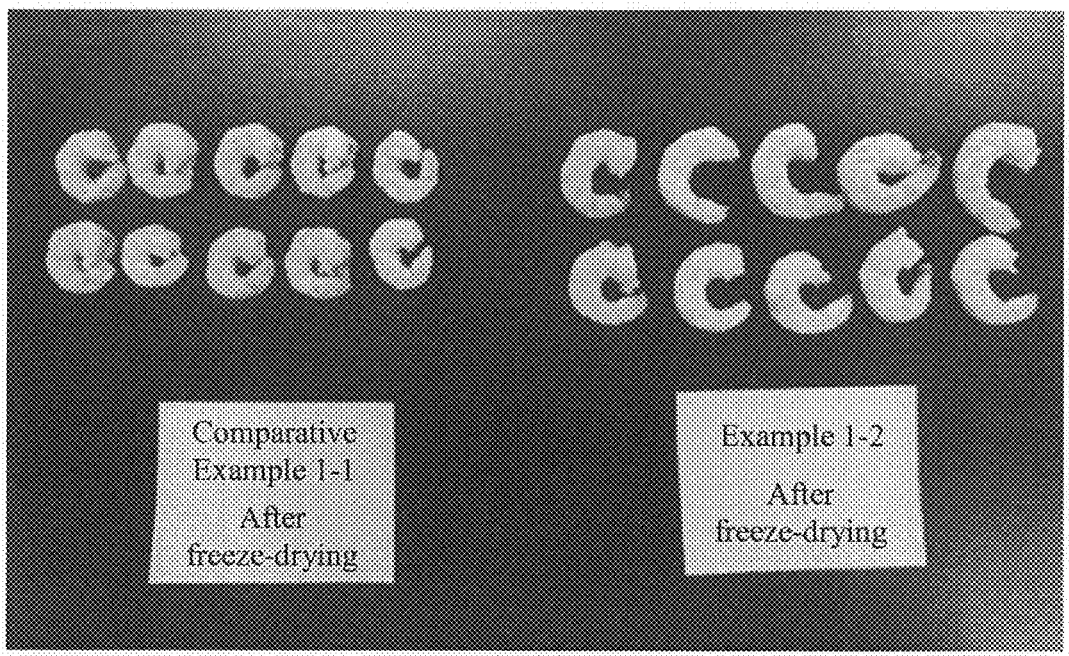
FIG. 1 is a photograph, taken after freeze-drying, of shrimp of Example 1-2 of the present invention and shrimp of Comparative Example 1-1.
Figure 2:
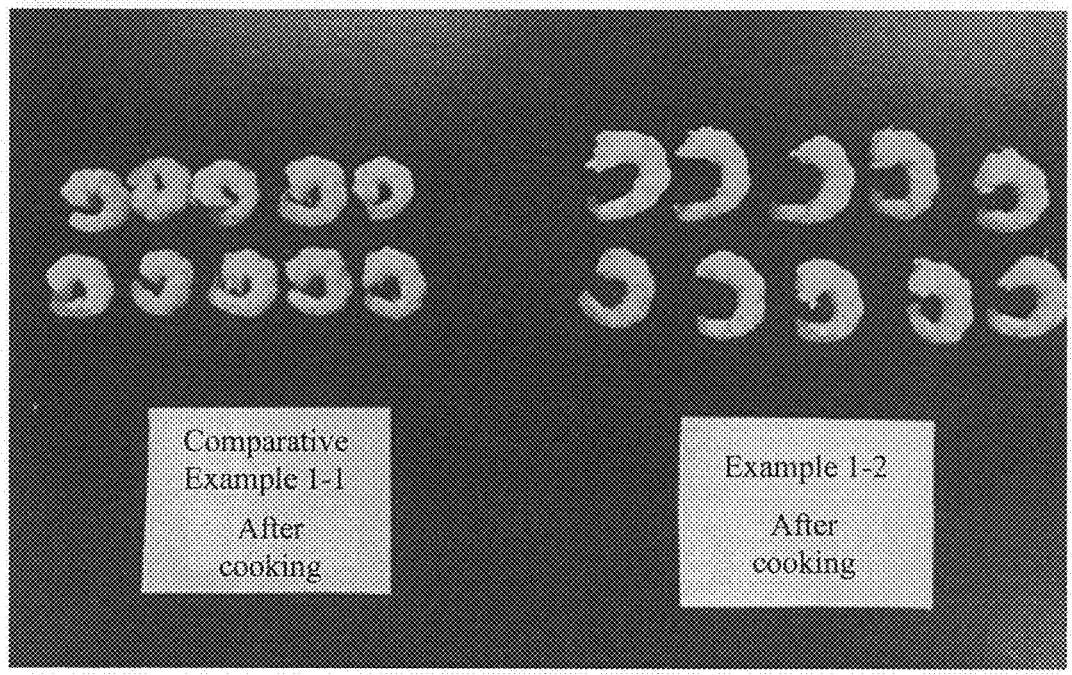
FIG. 2 is a photograph, taken after cooking by hot water pouring, of shrimp of Example 1-2 of the present invention and shrimp of Comparative Example 1-1.

Hereinafter, the present invention will be described in detail. It should be noted that the present invention is not limited by the following description.

1. Raw Material Shrimp

Various types of shrimp can be used as the raw material shrimp in the method for producing freeze-dried shrimp according to the present invention, and shrimp not subjected to any heating process may be used. Preferably, raw peeled shrimp are used, or raw peeled shrimp having been frozen are thawed and used. The species and origin of the raw material shrimp are not particularly limited and may be selected as appropriate depending on the type of the food in which the shrimp are to be used. The counts per unit weight of the raw material shrimp used may be about 50 to 500 shrimp per pound. When peeled shrimp are used, their size is preferably from 2 to 8 cm.

2. Step of Dipping in Solution of Polyphosphate and Step of Sterilization by Dipping Dipping the raw material shrimp in a solution of a polyphosphate makes it more likely that a plump, elastic texture is achieved after cooking by hot water pouring, although this step is not necessary for the present invention. Examples of the polyphosphate include sodium or potassium salts of polyphosphoric acid, metaphosphoric acid, and pyrophosphoric acid. These salts may be used alone, or a mixture of two or more thereof may be used. Preferred salts are sodium pyrophosphate and sodium tripolyphosphate, and a 1:1 mixture of these two salts is more preferably used. The preferred concentration is 0.5 to 2.0 wt % (W/W).

Additionally, the raw material shrimp may be dipped in a solution of sodium hypochlorite or a solution of ethanol for the purpose of sterilization of the raw material shrimp. The concentration of the solution of sodium hypochlorite is preferably about 10 to 100 ppm and the concentration of the solution of alcohol is preferably about 1 to 5 wt % (W/W).

3. Step of Heating by Dipping

The temperature of the hot water for the heating by dipping in the present invention is 65 to 75° C. Conventionally, heating of shrimp is carried out by boiling them in boiling water for a very short period of time. In this case, rapid protein modification occurs so that the size of the shrimp is reduced after the heating by dipping, besides which when the boiled shrimp are processed into freeze-dried shrimp and then the freeze-dried shrimp are reconstituted through cooking by hot water pouring, the plump, elastic texture specific to the boiled shrimp will be lost and the reconstituted shrimp will have a hard texture.

In contrast, dipping shrimp in hot water at a relatively low temperature of from 65 to 75° C. as in the present invention allows protein modification to progress slowly, in consequence of which the size of the shrimp after the heating by dipping is larger than that in the case of conventional boiling in boiling water. The shrimp heated by dipping has a soft, watery texture rather than a plump, elastic texture; however, when the heated shrimp are processed into freeze-dried shrimp and then the freeze-dried shrimp are reconstituted through cooking by hot water pouring, the reconstituted shrimp surprisingly present a plump, elastic texture specific to shrimp while maintaining a larger size than shrimp obtained through conventional boiling in boiling water do.

The temperature of the hot water for the heating by dipping in the present invention is more preferably 70 to 75° C.

The heating by dipping in the present invention is performed until the shrimp have an internal temperature of 60 to 70° C.

The internal temperature of the shrimp is measured for raw material shrimp of typical size among the used raw material shrimp by means of a temperature sensor inserted in the center of the body of the shrimp from their head toward their tail. If the internal temperature of the shrimp is lower than 60° C., the shrimp are in a raw or half-raw state where sufficient protein modification has not been achieved. In this case, the size of the shrimp after the heating by dipping is large indeed. However, when the shrimp are processed into freeze-dried shrimp and then the freeze-dried shrimp are reconstituted through cooking by hot water pouring, the shrimp will quickly decrease in size and have a texture having a strong fibrous feel. If the heating by dipping is performed so that the internal temperature of the shrimp increases beyond 70° C., the size of the shrimp after the heating by dipping will be similar to that in conventional cases; in addition, when the heated shrimp are processed into freeze-dried shrimp and then the freeze-dried shrimp are reconstituted through cooking by hot water pouring, the reconstituted shrimp will have a small size and hard texture similar to those in conventional cases.

In the present invention, the heating is more preferably performed until the shrimp have an internal temperature of 60 to 65° C.

4. Flavoring Step

In the present invention, the shrimp heated by dipping may be subjected to a flavoring step of seasoning or flavoring the shrimp. An exemplary way of flavoring is to mix the shrimp heated by dipping with a substance such as sugar, salt, soy sauce, sodium glutamate, spice, fat or oil such as sesame oil, dye, or flavor or dip the shrimp in an aqueous solution of such a substance.

5. Freezing Step

The shrimp subjected to the step of heating by dipping or the flavoring step is subsequently frozen. The way of freezing is not particularly limited. It is preferable to thoroughly freeze the shrimp until the product temperature of the shrimp is −20° C. or lower.

6. Freeze-Drying Step

Next, the frozen shrimp is freeze-dried under reduced pressure using a vacuum dryer. The conditions for freeze-drying are not particularly limited, and the drying may be performed using a degree of vacuum and a shelf heating temperature at which the shrimp will not be thawed. The shelf heating may, if necessary, be continued after the freeze-drying so as to heat and sterilize the dried shrimp for sterilization.

As described hereinbefore, when protein modification of shrimp in a method for producing freeze-dried shrimp is carried out by heating the shrimp by dipping them in hot water at a relatively low temperature, not only can the shrinkage of the shrimp due to the heating by dipping be small, but also the method can provide freeze-dried shrimp that present a larger apparent size after cooking by hot water pouring than conventional ones do and that present a good texture after cooking by hot water pouring.

Hereinafter, the present embodiment will be described in more detail by way of examples.

EXAMPLES

<Experiment 1> Temperature of Heating by Dipping and Internal Temperature of Shrimp

Example 1-1

Frozen raw peeled shrimp (Poovalan, counts per unit weight: 100 to 200 shrimp/pound) were thawed with running water, and shrimp each weighing about 3 to 3.5 g were sorted out to uniformize the size of shrimp to be used. Thus, about 100 g of thawed raw material shrimp were prepared.

The thawed raw material shrimp were heated by dipping them in hot water at 65° C. until the shrimp had an internal temperature of 60° C. The shrimp were then quickly taken out of the hot water, cooled with running water, and drained.

The cooled shrimp and a liquid seasoning (containing 1 g of salt, 0.5 g of sodium glutamate, 1 g of sugar, 0.02 g of paprika pigment, and 2 g of water) were mixed to flavor the shrimp.

The flavored shrimp were arranged on a tray for freeze-drying and frozen with a freezer at −30° C. overnight (the product temperature was confirmed to be −20° C. or lower).

The frozen shrimp were freeze-dried using a vacuum-freeze-drying device. The drying conditions were a degree of vacuum of 0.8 torr or less and a shelf heating temperature of 70° C., and the drying was performed until a final product temperature of 68° C. or higher was reached. A freeze-dried shrimp sample was thus prepared.

Example 1-2

A freeze-dried shrimp sample was prepared in the same manner as in Example 1-1, except that the thawed raw material shrimp were heated by dipping them in hot water at 70° C. until the shrimp had an internal temperature of 60° C.

Example 1-3

A freeze-dried shrimp sample was prepared in the same manner as in Example 1-1, except that the thawed raw material shrimp were heated by dipping them in hot water at 70° C. until the shrimp had an internal temperature of 65° C.

Example 1-4

A freeze-dried shrimp sample was prepared in the same manner as in Example 1-1, except that the thawed raw material shrimp were heated by dipping them in hot water at 75° C. until the shrimp had an internal temperature of 60° C.

Example 1-5

A freeze-dried shrimp sample was prepared in the same manner as in Example 1-1, except that the thawed raw material shrimp were heated by dipping them in hot water at 75° C. until the shrimp had an internal temperature of 65° C.

Example 1-6

A freeze-dried shrimp sample was prepared in the same manner as in Example 1-1, except that the thawed raw material shrimp were heated by dipping them in hot water at 75° C. until the shrimp had an internal temperature of 70° C.

Comparative Example 1-1

A freeze-dried shrimp sample was prepared in the same manner as in Example 1-1, except that the thawed raw material shrimp were subjected to a boiling process in boiling water until the shrimp had an internal temperature of 60° C.

Comparative Example 1-2

A freeze-dried shrimp sample was prepared in the same manner as in Example 1-1, except that the thawed raw material shrimp were heated by dipping them in hot water at 65° C. until the shrimp had an internal temperature of 55° C.

Comparative Example 1-3

A freeze-dried shrimp sample was prepared in the same manner as in Example 1-1, except that the thawed raw material shrimp were heated by dipping them in hot water at 70° C. until the shrimp had an internal temperature of 55° C.

Comparative Example 1-4

A freeze-dried shrimp sample was prepared in the same manner as in Example 1-1, except that the thawed raw material shrimp were heated by dipping them in hot water at 75° C. until the shrimp had an internal temperature of 55° C.

Comparative Example 1-5

A freeze-dried shrimp sample was prepared in the same manner as in Example 1-1, except that the thawed raw material shrimp were heated by dipping them in hot water at 80° C. until the shrimp had an internal temperature of 60° C.

Comparative Example 1-6

A freeze-dried shrimp sample was prepared in the same manner as in Example 1-1, except that the thawed raw material shrimp were heated by dipping them in hot water at 75° C. until the shrimp had an internal temperature of 72° C.

The shrimp as boiled or heated by dipping in the above experiments were subjected to sensory evaluation of the size and texture of the shrimp. The evaluation was made by five experienced panelists on a four-point scale.

The evaluation of the size of the shrimp after boiling or heating by dipping was conducted using as a reference the size of the shrimp of Comparative Example 1-1 corresponding to a conventional product: shrimp smaller than those of Comparative Example 1-1 were rated "X", shrimp comparable to those of Comparative Example 1-1 were rated "Δ", shrimp larger than those of Comparative Example 1-1 were rated "◯", and shrimp considerably larger than those of Comparative Example 1-1 were rated "⊚".

The evaluation of the texture of the shrimp after boiling or heating by dipping was conducted on the basis of the texture of the shrimp after boiling in Comparative Example 1-1: shrimp having a plump, elastic texture comparable to that of the shrimp of Comparative Example 1-1 were rated "⊚", shrimp having a plump, elastic texture inferior to that of the shrimp of Comparative Example 1-1 were rated "◯", shrimp having a soft, watery texture being not raw but inferior in plumpness and elasticity to the texture of the shrimp of Comparative Example 1-1 were rated "Δ", and shrimp having a half-raw or raw texture considerably inferior in plumpness and elasticity to the texture of the shrimp of Comparative Example 1-1 were rated "X".

The freeze-dried shrimp sample prepared as above was also subjected to sensory evaluation. The size and texture of the shrimp after cooking by hot water pouring were evaluated. The evaluation was made by the same five panelists, on a four-point scale for the size and on a five-point scale for the texture. The cooking by hot water pouring was carried out by placing 10 freeze-dried shrimp in a cup-shaped container and pouring 400 ml of hot water prepared beforehand into the container to reconstitute the shrimp for 3 minutes.

The size after cooking by hot water pouring was visually evaluated using as a reference the size of the shrimp of Comparative Example 1-1 corresponding to a conventional product: shrimp smaller than those of Comparative Example 1-1 were rated "X", shrimp comparable to those of Comparative Example 1-1 were rated "Δ", shrimp larger than those of Comparative Example 1-1 were rated "○", and shrimp considerably larger than those of Comparative Example 1-1 were rated "⊚".

For the texture after cooking by hot water pouring, each panelist tried two shrimp of each sample and made evaluation as follows: very superior shrimp having a plump, elastic texture were rated "5", superior shrimp having a plump, elastic texture were rated "4", passable shrimp having a texture having a plump, elastic feel were rated "3", inferior shrimp having a texture having no plump, elastic feel were rated "2", and very inferior shrimp devoid of any plump, elastic texture were rated "1".

The evaluation results of Experiment 1 are shown in Table 1.

<Experiment 2> Dipping in Aqueous Solution of Polyphosphate

Example 2-1

Frozen raw peeled shrimp (Poovalan, counts per unit weight: 100 to 200 shrimp/pound) were thawed with running water, and shrimp each weighing about 3 to 3.5 g were sorted out to uniformize the size of shrimp to be used. Thus, about 100 g of thawed raw material shrimp were prepared.

The raw material shrimp were dipped in a 1 wt % (W/W) aqueous solution of sodium tripolyphosphate for 1 hour, after which the shrimp were drained.

The dipped raw material shrimp were heated by dipping them in hot water at 70° C. until the shrimp had an internal temperature of 60° C. The shrimp were then quickly taken out of the hot water, cooled with running water, and drained.

The cooled shrimp and a liquid seasoning (containing 1 g of salt, 0.5 g of sodium glutamate, 1 g of sugar, 0.02 g of paprika pigment, and 2 g of water) were mixed to flavor the shrimp.

The flavored shrimp were arranged on a tray for freeze-drying and frozen with a freezer at −30° C. overnight (the product temperature was confirmed to be −20° C. or lower).

The frozen shrimp were freeze-dried using a vacuum-freeze-drying device. The drying conditions were a degree of vacuum of 0.8 torr or less and a shelf heating temperature of 70° C., and the drying was performed until a final product temperature of 68° C. or higher was reached. A freeze-dried shrimp sample was thus prepared.

TABLE 1

| Experiment plot | Temperature of heating by dipping | Internal temperature of shrimp | Size after heating by dipping | Texture after heating by dipping | Size after cooking by hot water pouring | Texture after cooking by hot water pouring |
| --- | --- | --- | --- | --- | --- | --- |
| Example 1-1 | 65° C. | 60° C. | ⊚ | Δ | ○<br>Shrank upon cooking | 3<br>Passable<br>Texture having plump, elastic feel, albeit with somewhat fibrous feel |
| Example 1-2 | 70° C. | 60° C. | ⊚ | Δ | ⊚ | 4<br>Superior |
| Example 1-3 | 70° C. | | ⊚ | Δ | ⊚ | 4<br>Superior |
| Example 1-4 | 75° C. | 60° C. | ⊚ | Δ | ⊚ | 4<br>Superior |
| Example 1-5 | 75° C. | 65° C. | ⊚-○ | Δ | ⊚-○ | 3.5 |
| Example 1-6 | 75° C. | 70° C. | ○ | ○-Δ<br>Surface was somewhat firm. | ○ | 3<br>Passable<br>Texture having plump, elastic feel, albeit somewhat hard |
| Comparative Example 1-1 | 100° C. (boiling) | 60° C. | Δ (reference) | ⊚ (reference) | Δ (reference) | 2<br>Hard |
| Comparative Example 1-2 | 65° C. | 55° C. | ⊚ | X<br>Raw | Δ<br>Significantly shrank upon cooking | 2<br>Strong fibrous feel |
| Comparative Example 1-3 | 70° C. | 55° C. | ⊚ | X<br>Half-raw | ○-Δ<br>Shrank upon cooking | 2.5<br>Somewhat strong fibrous feel |
| Comparative Example 1-4 | 75° C. | 55° C. | ⊚ | X<br>Half-raw | ○-Δ<br>Shrank upon cooking | 2.5<br>Somewhat strong fibrous feel |
| Comparative Example 1-5 | 80° C. | 60° C. | Δ | ○ | Δ | 2.5<br>Somewhat hard |
| Comparative Example 1-6 | 75° C. | 72° C. | Δ | ○ | Δ | 2.5<br>Somewhat hard |

Example 2-2

A freeze-dried shrimp sample was prepared in the same manner as in Example 2-1, except that the raw material shrimp were dipped in a 1 wt % (W/W) aqueous solution of sodium pyrophosphate.

Example 2-3

A freeze-dried shrimp sample was prepared in the same manner as in Example 2-1, except that the raw material shrimp were dipped in an aqueous solution in which a polyphosphate formulation prepared by mixing sodium tripolyphosphate and sodium pyrophosphate in a weight ratio of 1:1 was dissolved to a concentration of 1 wt % (W/W).

Example 2-4

A freeze-dried shrimp sample was prepared in the same manner as in Example 2-1, except that the raw material shrimp were dipped in an aqueous solution in which a polyphosphate formulation prepared by mixing sodium tripolyphosphate and sodium pyrophosphate in a weight ratio of 1:1 was dissolved to a concentration of 0.5 wt % (W/W).

Example 2-5

A freeze-dried shrimp sample was prepared in the same manner as in Example 2-1, except that the raw material shrimp were dipped in an aqueous solution in which a polyphosphate formulation prepared by mixing sodium tripolyphosphate and sodium pyrophosphate in a weight ratio of 1:1 was dissolved to a concentration of 2.0 wt % (W/W).

Comparative Example 2-1

A freeze-dried shrimp sample was prepared in the same manner as in Example 2-3, except that the dipped raw material shrimp were subjected to a boiling process in boiling water until the shrimp had an internal temperature of 60° C.

The frozen shrimp samples thus prepared were evaluated in the same manner as in Experiment 1. The evaluation results of Experiment 2 are shown in Table 2.

TABLE 2

| Experiment plot | Temperature of heating by dipping | Internal temperature of shrimp | Polyphosphate | Concentration | Size after cooking by hot water pouring | Texture after cooking by hot water pouring |
|---|---|---|---|---|---|---|
| Example 1-4 | 70° C. | 60° C. | Not applicable | Not applicable | ⊚ | 4 Superior |
| Example 2-1 | 70° C. | 60° C. | Sodium tripolyphosphate | 1% | ⊚ | 4.5 Having plumper, more elastic texture than Example 1-4 |
| Example 2-2 | 70° C. | 60° C. | Sodium pyrophosphate | 1% | ⊚ | 4.5 Having plumper, more elastic texture than Example 1-4 |
| Example 2-3 | 70° C. | 60° C. | Sodium pyrophosphate:Sodium tripolyphosphate 1:1 | 1% | ⊚ | 5 Very superior |
| Example 2-4 | 70° C. | 60° C. | Sodium pyrophosphate:Sodium tripolyphosphate 1:1 | 0.50% | ⊚ | 4.5 Having plumper, more elastic texture than Example 1-4 |
| Example 2-5 | 70° C. | 60° C. | Sodium pyrophosphate:Sodium tripolyphosphate 1:1 | 2% | ⊚ | 4.5 Having plumper, more elastic texture than Example 1-4 |
| Comparative Example 1-1 | 100° C. (boiling) | 60° C. | Not applicable | Not applicable | Δ (reference) | 2 Hard |
| Comparative Example 2-1 | 100° C. (boiling) | 60° C. | Sodium pyrophosphate: Sodium tripolyphosphate 1:1 | 1% | Δ-○ Only slightly larger | 2.5 Somewhat hard and firm |

The invention claimed is:

1. A method for producing freeze-dried shrimp, comprising:
    heating raw material shrimp by dipping the raw material shrimp in hot water having a temperature in a range from 70 to 75° C. until the shrimp have an internal temperature in a range from 60 to 65° C., the internal temperature of the shrimp being lower than the temperature of the hot water;
    freezing the shrimp heated by the dipping; and
    freeze-drying the frozen shrimp.
2. The method for producing freeze-dried shrimp according to claim 1,
    wherein the heating by dipping the raw material shrimp is preceded by dipping the raw material shrimp in an aqueous solution comprising polypohosphate in an amount in a range from 0.5 to 2 wt % relative to the aqueous solution.
3. The method for producing freeze-dried shrimp according to claim 2,
    wherein the polyphosphate in the aqueous solution is sodium tripolyphosphate or sodium pyrophosphate or a combination thereof.

4. The method for producing freeze-dried shrimp according to claim 1, the method further comprising shelf heating the resulting freeze-dried shrimp after the freeze-drying of the frozen shrimp, so as to sterilize the dried shrimp.

5. The method for producing freeze-dried shrimp according to claim 1,
wherein in the heating, the internal temperature of the shrimp in the range from 60 to 65° C. is at least 5° C. lower than the temperature of the hot water.

6. The method for producing freeze-dried shrimp according to claim 1,
wherein in the heating, the internal temperature of the shrimp in the range from 60 to 65° C. is from 5° C. to 15° C. lower than the temperature of the hot water.

\* \* \* \* \*